(12) United States Patent
Krajnovich et al.

(10) Patent No.: US 7,088,532 B1
(45) Date of Patent: Aug. 8, 2006

(54) HEAD-DISK INTERFACE PRECONDITIONING USING WRITE CURRENT BEFORE SERVO TRACK WRITE

(75) Inventors: Douglas Krajnovich, Santa Clara, CA (US); Quinn Haddock, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 238 days.

(21) Appl. No.: 10/124,615

(22) Filed: Apr. 16, 2002

Related U.S. Application Data

(60) Provisional application No. 60/285,016, filed on Apr. 19, 2001.

(51) Int. Cl.
*G11B 5/02* (2006.01)
*G11B 21/02* (2006.01)

(52) U.S. Cl. .................................. 360/25; 360/75
(58) Field of Classification Search ................ 360/25, 360/75
See application file for complete search history.

(56) References Cited

U.S. PATENT DOCUMENTS

| | | | |
|---|---|---|---|
| 3,638,089 A | 1/1972 | Gabor | 318/318 |
| 4,384,311 A | 5/1983 | McNeil | 360/128 |
| 4,490,766 A | 12/1984 | Hill et al. | 360/137 |
| 4,510,541 A | 4/1985 | Sasamoto | 360/97 |
| 4,594,617 A | 6/1986 | Tezuka | 360/73 |
| 5,199,250 A | 4/1993 | Ermacora et al. | 56/15.2 |
| 5,307,489 A | 4/1994 | Yamazaki | 395/650 |
| 5,351,156 A | 9/1994 | Gregory et al. | 360/74.1 |
| 5,424,884 A | 6/1995 | Nonaka | 360/74.1 |
| 5,461,521 A * | 10/1995 | Ito et al. | 360/75 |
| 5,535,073 A | 7/1996 | Brezoczky et al. | 360/105 |
| 5,612,830 A | 3/1997 | Gregory et al. | 360/69 |
| 5,696,643 A | 12/1997 | Tsuwako et al. | 360/73.03 |
| 5,793,553 A | 8/1998 | Smith | 360/74.1 |
| 5,850,321 A | 12/1998 | McNeil et al. | 360/106 |
| 5,863,237 A * | 1/1999 | Felts et al. | 451/41 |
| 5,880,899 A * | 3/1999 | Blachek et al. | 360/66 |
| 6,049,439 A | 4/2000 | Ono et al. | 360/53 |
| 6,055,139 A * | 4/2000 | Ohtsuka et al. | 360/131 |
| 6,084,753 A | 7/2000 | Gillis et al. | 360/128 |
| 6,373,651 B1 | 4/2002 | French et al. | 360/78.04 |
| 6,493,168 B1 | 12/2002 | French et al. | 360/73.03 |
| 6,687,077 B1 | 2/2004 | French et al. | 360/73.03 |
| 6,707,634 B1 * | 3/2004 | Kagami et al. | 360/75 |
| 6,772,507 B1 * | 8/2004 | Aoki | 29/603.16 |

FOREIGN PATENT DOCUMENTS

| | | | |
|---|---|---|---|
| JP | 05054347 A | 3/1993 | 360/75 |

\* cited by examiner

*Primary Examiner*—Wayne Young
*Assistant Examiner*—Daniel L. Negron
(74) *Attorney, Agent, or Firm*—Tejpal S. Hansra

(57) ABSTRACT

Disk drive preconditioning allows the head-disk interface to be burnished or worn so that head-disk interference is reduced or eliminated before servo track writing. The head is positioned closer to the disk than the normal fly height during a preconditioning sweep and then returns to the normal fly height during servo track writing.

90 Claims, 4 Drawing Sheets

HEAD-DISK INTERFACE PRECONDITIONING USING WRITE CURRENT BEFORE SERVO TRACK WRITE

RELATED APPLICATION

This application claims priority from U.S. Provisional Application Ser. No. 60/285,016, filed on Apr. 19, 2001, entitled "Use of High Write Current to Pre-Condition a Head-Disk Interface Before Servo Track Write" which is incorporated herein by reference.

FIELD OF THE INVENTION

The present invention relates to disk drives, and in particular to disk drive preconditioning for recording.

BACKGROUND OF THE INVENTION

Disk drives are well known in the computer art for providing secondary mass storage with random access. A disk drive comprises one or more magnetic data storage disks rotated on a spindle by a spindle motor within an enclosed housing. A magnetic read/write head (transducer or slider) with an air bearing surface is placed on an actuator and positioned very closely to a corresponding disk surface.

Disk drives currently achieve state of the art magnetic recording using heads with magneto-resistive (MR) read elements. MR heads operate with an average fly height (head-disk clearance) of about 15 nm (0.6 microinch), however manufacturing and environmental variability cause fly height variability which leads to head-disk contact at a small percentage of the head-disk interfaces. Head-disk contact results in friction forces and thermal transients which cause problems with magnetic recording. Disk drives in the future shall require fly heights to be reduced to 10 nm or below to achieve the required signal-to-noise ratios at increased bit densities and track densities. This will increase the percentage of head-disk interfaces which experience contact.

High fly write (high fly height during a write operation) occurs when the head attempts to write to the disk and the magnetic clearance between the head and the disk is much higher than normal. High fly write can be due to particle contamination, particle interaction, disk lubricant with non-uniform distribution (at the micron or sub-micron scale), disk lubricant or debris pickup, and disk asperities (protrusions). High fly write can lead to missing or poorly written information on the disk.

The close proximity of the head to the disk enables very high-resolution servo patterns and user data to be recorded on the disk. The servo patterns are typically written in servo sectors which are interleaved between data sectors or blocks. The servo patterns provide a servo controller with head position information to enable a head positioner, such as a rotary voice coil motor, to move the actuator and therefore the head from track-to-track during random access track seeking operations, and to maintain the head in proper alignment with a track during track following operations when user data is written to or read from the available data sectors.

The servo controller receives head position readings from the head and determines the head position from the servo patterns. The servo patterns may include the track number and indicate how far the head is from the track centerline. As the head passes over the servo patterns, the track identification and position indicators are read by the head and supplied to the servo controller.

Servo track writing in which the servo patterns are written to the disk is becoming an increasingly difficult and expensive part of the manufacturing process. A servo track writer is typically stabilized on a large granite base to minimize unwanted vibration and employs laser interferometry for precise position measurements. The servo track writer supplies power to the spindle motor for rotating the disk and may include a fixed head for writing a clock track to one disk surface. The servo track writer typically requires direct mechanical access to the actuator to move the actuator and the head very precisely across the disk as the head writes the track address and the servo patterns at servo sectors for each track.

Servo track writing is degraded by two major factors that perturb the fly height or fly stability of the head which causes the servo patterns to be written with deviations from ideal, circular, evenly spaced servo patterns. The first factor is external vibration which leads to non-circular tracks (non-repeatable runout) and variable track squeeze. The second factor is head-disk interaction which leads to high fly write. During servo track writing, high fly write can cause missing, degraded or improperly written servo patterns which can range from a single track to a wide annular region on the disk.

Head-disk interaction is more likely to occur during the initial operation of the disk drive. Once the disk drive has operated for an extended period of time, particles tend to get swept out of the flyable zone and the disk lubricant tends to get smoothed out. In addition, small asperities on the head and the disk tend to get burnished out in the first minutes to hours of disk drive operation. However, the most critical disk drive write operation is servo track writing where a blank disk that has been stored in a cassette for an extended period of time is loaded into the disk drive and flown on for the first time since leaving the media factory. Lack of a break-in period for the head-disk interface before servo track writing may result in head-disk interactions during servo track writing that cause non-circular tracks, variable track squeeze and missing or degraded servo bursts. In addition, since servo track writing includes little or no reading from the disk, the fidelity of the servo patterns is determined later during self-test of the disk drive.

Conventionally, a burnishing head removes asperities or contamination from the disk that may interfere with the head in order to precondition the disk before servo track writing. An extended time period is spent sweeping the burnishing head across the disk in either a linear or butterfly fashion. However, long preconditioning sweeps are time consuming and short preconditioning sweeps are ineffective because the head flies at the normal fly height.

There is, therefore, a need for reducing the time for preconditioning the head-disk interface before servo track writing.

BRIEF SUMMARY OF THE INVENTION

The present invention satisfies these needs. The present invention provides efficient preconditioning in a disk drive that allows the head-disk interface to be burnished or worn to reduce or eliminate undesirable head-disk interference before servo track writing. The head is positioned closer to the disk than the normal fly height during a preconditioning sweep and then returns to the normal fly height during servo track writing.

In an embodiment, a write current causes thermal expansion in the head so that the head is lower than the normal fly height as the actuator moves the head across the disk during the preconditioning sweep and interference between the head and the disk burnishes the head-disk interface.

In another embodiment, the actuator movement profile and speed causes increased contact between the head and the disk as the head moves across the disk and interference between the head and the disk burnishes the head-disk interface.

Advantageously, the preconditioning can provide head smoothing, fly height reduction, disk contamination removal, disk asperity reduction and disk lubricant smoothing. As a result, the head-disk interface is preconditioned for reliable magnetic recording at high bit densities and high track densities during servo track writing.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
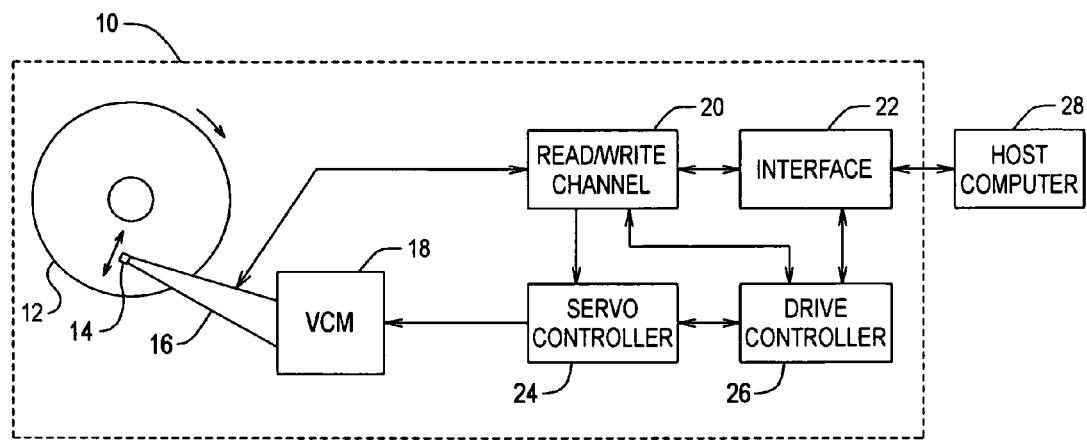
FIG. 1 shows a disk drive that can be preconditioned for servo track writing according to the present invention.

FIG. 1 is a block diagram illustrating a disk drive 10 that can be preconditioned for servo track writing according to the present invention. The disk drive 10 includes a data storage disk 12, a read/write head 14, an actuator 16, a voice coil motor (VCM) 18, a read/write channel 20, an interface 22, a servo controller 24 and a drive controller 26. The disk drive 10 is coupled to an external host computer 28 that uses the disk drive 10 as a mass storage device. The disk drive 10 receives read and/or write requests from the host computer 28 and carries out the requests by performing data transfers between the disk 12 and the host computer 28. In a preferred embodiment, the disk drive 10 includes multiple disks 12 in a vertical stack and multiple heads 14 with one head 14 for each operative disk surface.

The interface 22 provides an interface between the disk drive 10 and the host computer 28. During read and write operations, the interface 22 provides a communications path that includes data buffering between the channel 20 and the host computer 28. In addition, the interface 22 receives commands and requests from the host computer 28 and directs them to the drive controller 26. The drive controller 26 then carries out the commands by appropriately controlling the elements within the disk drive 10.

The VCM 18 controllably positions the head 14 with respect to the disk 12 in response to a control signal generated by the servo controller 24. The head 14 is coupled to the actuator 16 and moves under the influence of the VCM 18. When performing a read or write operation, the drive controller 26 instructs the servo controller 24 to move the head 14 to a target track on the disk 12 so that a data transfer can take place.

Figure 2:
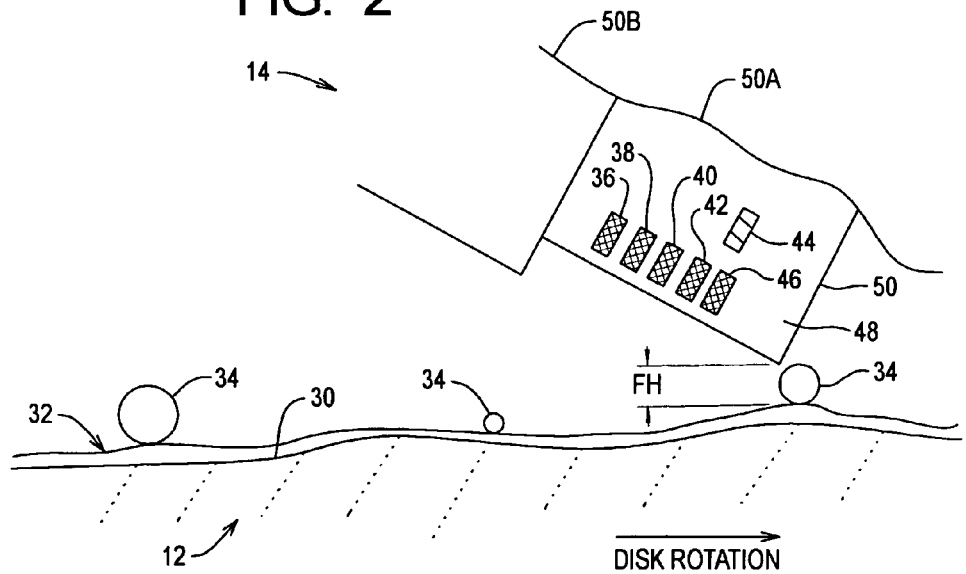
FIG. 2 shows a cross-section portion of a head and a disk at normal fly height.

FIG. 2 shows a cross-section portion of the head 14 over an exaggerated cross-section portion of a disk surface 30 of the disk 12 at a normal fly height (FH).

The disk 12 is rotated by a spindle motor (not shown) and creates air flow that causes the head 14 to be hydrodynamically lifted and fly above the disk surface 30. In addition, the disk surface 30 is covered with a layer of a lubricant 32, and contaminant particles 34 reside on the lubricant 32.

The head 14 includes a first shield 36, a giant magneto-resistive (GMR) read stripe 38, a second shield 40, a first write pole 42, a write coil 44, a second write pole 46 and a trailing edge portion 48. The write poles 42 and 46 are separated by a write gap, and a magnetic field is generated when the write poles 42 and 46 are excited by a write current flowing in the write coil 44. The magnetic field generated by the write poles 42 and 46 creates selected magnetic orientations in selected locations on the disk 12. A trailing edge portion 48 is located behind the read stripe 38, the write coil 44, the shields 36 and 40 and the write poles 42 and 46.

The head 14 also includes a ceramic body 50 that includes ceramic body portions 50A and 50B. The ceramic body portion 50A surrounds the read stripe 38, the write coil 44, the shields 36 and 40 and the write poles 42 and 46 and includes the trailing edge portion 48, and the ceramic body portion 50B is adjacent to the ceramic body portion 50A on the side opposite the trailing edge portion 48. The ceramic body portion 50A is made of alumina, and the ceramic body portion 50B is made of alumina and titanium-carbide.

The present invention preconditions the head-disk interface before servo track writing the disk drive 10. To prepare the disk drive 10 for servo track writing, the head-disk interface is subjected to a preconditioning sweep. During the preconditioning sweep, the head 14 is closer to the disk 12 than the normal fly height, and thereafter, during servo track writing, the head 14 is returned to the normal fly height. In a first embodiment, the head-disk interface is preconditioned using a write current that causes the head 14 to thermally expand towards the disk 12 and create head-disk interference, and the head 14 has a flying air bearing surface. In a second embodiment, the head-disk interface is preconditioned using a selected movement profile and speed for the actuator 16 to create head-disk interference, the head 14 has a burnish proximity air bearing surface and the write current is optional.

Figure 3:
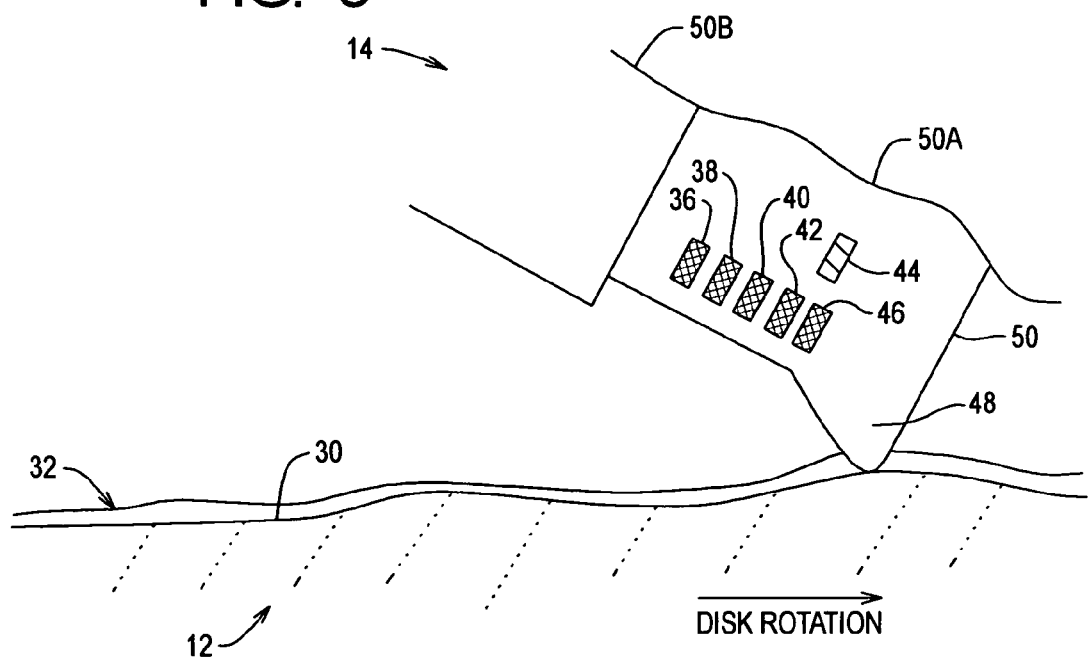
FIG. 3 shows a cross-section portion of a head and a disk at reduced fly height.

FIG. 3 shows a cross-section portion of the head 14 over an exaggerated cross-section portion of the disk surface 30 of the disk 12 at a reduced fly height in accordance with the first embodiment. A high write current is selected and applied to the head 14 to cause thermal expansion of the head 14 and thereby reduce the fly height of the head 14. In particular, the write current causes thermally induced deformation of the head 14 at the trailing edge portion 48 and the photoresist used to insulate the write coil 44. For example, a reduction in head-disk clearance of about 0.25 microinch or more can be achieved when the write coil 44 is driven with a write current of about 60 mA. The write current dissipates about 50 mW of thermal energy in the trailing edge portion 48 and leads to a 25° C. temperature rise for the head 14. Without being bound by theory, it is believed that the head-disk clearance reduction occurs because the trailing edge portion 48 bulges due to a higher thermal expansion coefficient of the photoresist insulation in the write coil 44 than the thermal expansion coefficient of the alumina in the ceramic body portion 50A.

During normal operation of disk drives like the disk drive 10, such a high write current and resulting thermal expansion of the heads 14 reduces the head-disk clearance to zero in a sizeable percentage of the heads 14, and the resulting frictional and/or capillary force at the trailing edge portions 48 of the heads 14 with zero clearance can cause the heads 14 to move off-track. While this is a problem for normal disk drive operation, it is an opportunity for preconditioning the head-disk interface for subsequent servo track writing. Because there is no magnetic information written on the disk 12 before servo track writing, during the preconditioning the high write current can be exploited to reduce the fly height of the head 14 and scrub the disk 12. Because the servo track writing is performed at room temperature, in the above example a normal write current of about 25 mA is used for servo track writing after preconditioning with a high write current of about 60 mA.

After the preconditioning sweep, the write current is then returned to the normal value, thereby restoring the normal fly height for the head 14. By preconditioning the head-disk interface at the reduced fly height, there is improved scrubbing action of the head 14 on the disk surface 30, leading to a reduced incidence of missing, degraded or improperly written servo patterns for a given preconditioning time. Further, the scrubbing smoothes out the disk lubricant 32 like a real-time lube buff.

Figure 4A:
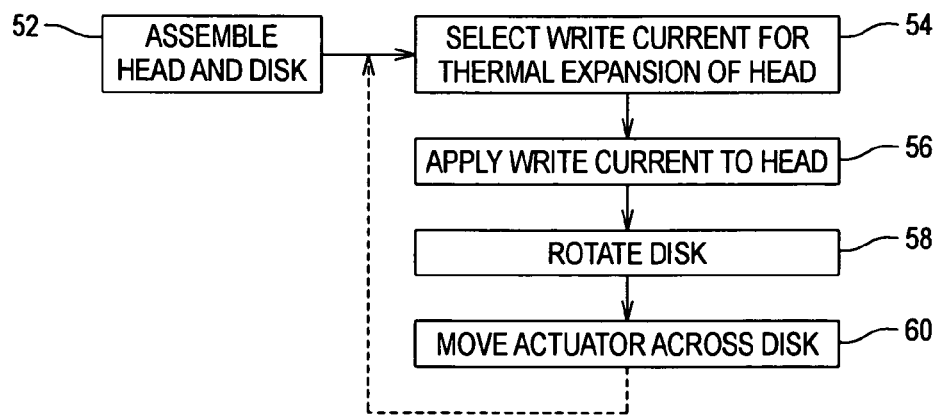
FIG. 4A shows a flowchart of a preconditioning method.

FIG. 4A shows a flowchart of the preconditioning method according to the first embodiment. After the initial head-disk assembly (step 52), a write current is selected for the preconditioning sweep (step 54). Depending on the geometry of the head 14, the write current is selected to be high enough for thermal expansion of the head 14 to reduce head-disk clearance, preferably to zero, and result in frictional force between the head 14 and the disk surface 30 for scrubbing action. As such, the write current is applied to the head 14 to cause thermal expansion of the head 14 (step 56), the disk 12 is rotated by the spindle motor (step 58), and the actuator 16 carrying the head 14 is swept (preferably at reduced speed) across the disk 12 (step 60).

In the second embodiment, the head 14 has a burnish proximity air bearing surface, and the actuator 16 sweeps the head 14 across the disk 12 at reduced sweep speed according to a selected movement profile and speed to increase interfering contact at the head-disk interface. As a result, the head 14 scrubs the disk surface 30 to smooth out the disk lubricant 32 and improve servo track writing as described in the first embodiment. In addition, since head-disk contact is inevitable during normal disk drive operation due to the proximity air bearing surface, the preconditioning allows the head-disk interface to function adequately during normal disk drive operation without significant friction or thermal excitation of the head 14. Further, the head 14 can have negative clearance until it is burnished during the preconditioning.

The actuator 16 sweeps the head 14 across the disk 12 at a minimum speed that depends on the size of the proximity air bearing surface and the contact surface (pads) of the head 14. The actuator 16 movement step size and speed also provides maximum exposure of the contact surface of the head 14 with the disk surface 30. For a contact surface with etched micropad widths of about 40 micrometers, the optimum sweep speed is about 0.1 to 50 mm/sec (e.g., 4 mm/sec). Burnishing and cleaning effectiveness at higher sweep speeds is somewhat reduced, but may be acceptable. In addition, different sweep speeds can be used for different processing times.

Figure 4B:
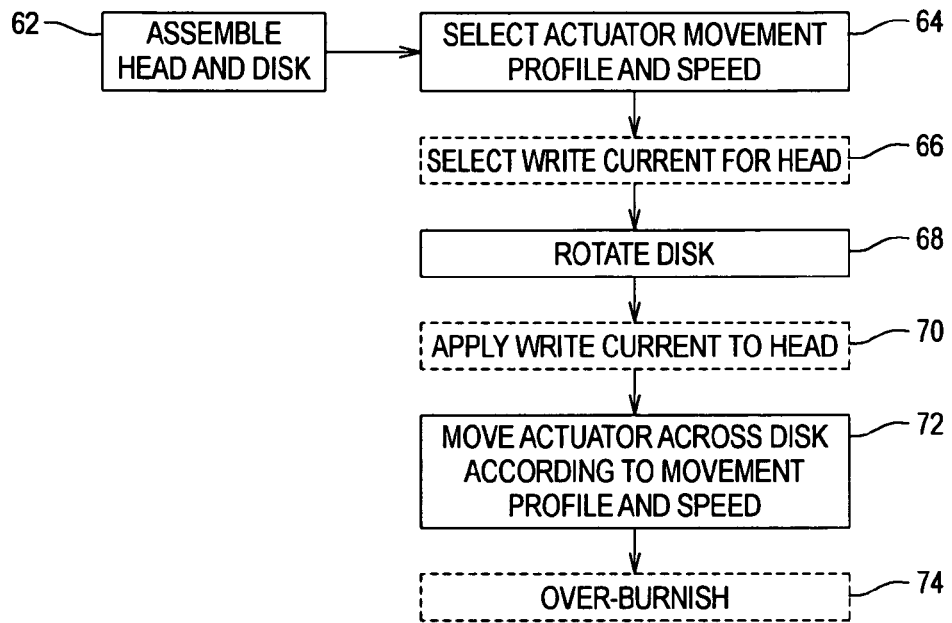
FIG. 4B shows a flowchart of another preconditioning method.

FIG. 4B shows a flowchart of the preconditioning method according to the second embodiment. After the initial head-disk assembly (step 62), a movement profile and speed is selected for moving the actuator 16 across and thus sweeping the head 14 across the disk 12 (step 64), and optionally a write current is selected for the head 14 (step 66). The disk 12 is then rotated (step 68), optionally the write current is applied to the head 14 (step 70) and the actuator 16 sweeps the head 14 across the disk 12 according to the movement profile and speed (step 72). An optional final burnish that applies the write current while stepping or seeking the head 14 across the disk 12 can be performed during self-test to over-burnish the head-disk interface (step 74). The over-burnish generates sufficient head-disk clearance to allow for fly height changes in the field which may be caused by increased temperature (thermal protrusion, thermal crown, air property effect on the air bearing), reduced pressure (high altitude), and debris collection on the air bearing surface.

The burnishing may be performed at any point in the build/test of the disk drive 10. Preferably, some burnishing is performed prior to critical operations, such as servo track writing, which require low friction and noise. Further, an in-field firmware diagnostic process that monitors the head-disk interface and detects head-disk contact can perform the over-burnishing in the field to recover or re-generate the head-disk clearance.

Figure 5:
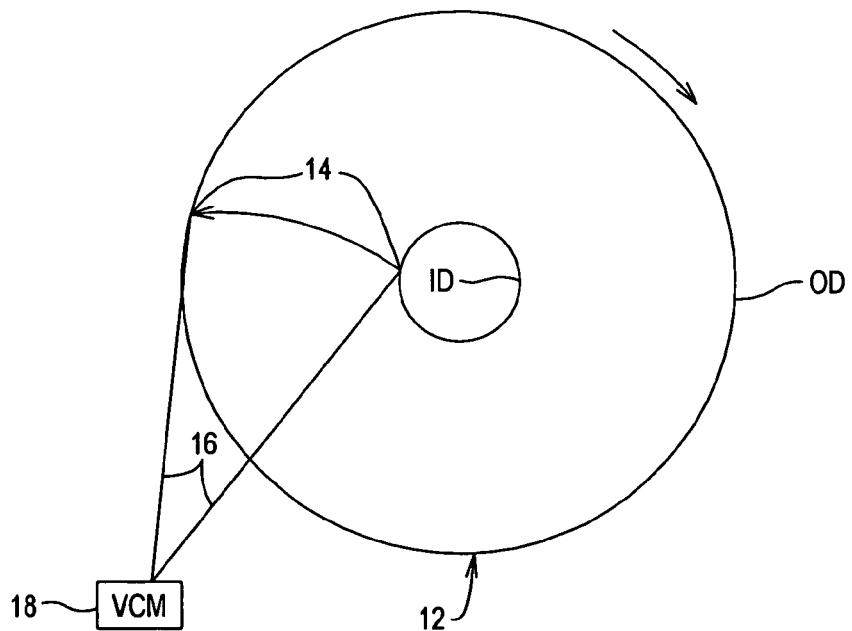
FIG. 5 shows an actuator sweeping over a rotating disk.

FIG. 5 shows the actuator 16 motion can preferably start at the inner diameter (ID) and finish at the outer diameter (OD) of the rotating disk 12, allowing large debris to be swept toward the outer diameter rather than be trapped at the inner diameter. Alternatively, the actuator 16 motion can be from the outer diameter to the inner diameter of the rotating disk 12. The process can be repeated as necessary. In one example, the controllers 24 and/or 26 are configured to apply the write current and control the VCM 18 to sweep the actuator 16 and thus the head 14 across the disk 12. Other control methods for moving the actuator 16 such as using a servo track writer are also possible.

Figure 6:
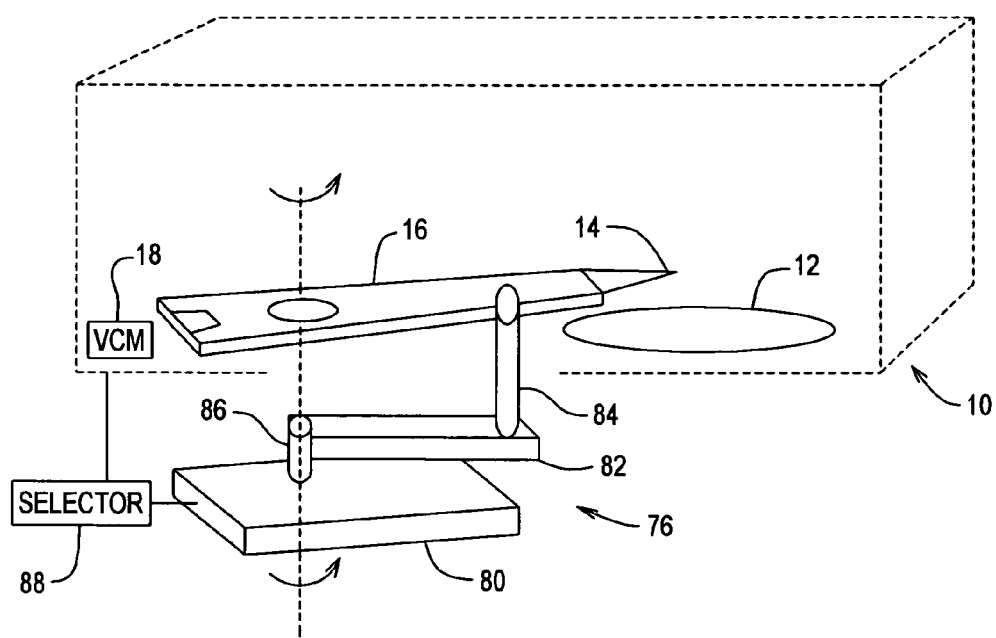
FIG. 6 shows a servo track writer for writing servo patterns on a disk in a disk drive.

FIG. 6 shows a servo track writer 76 that can precondition the disk drive 10. The servo track writer 76 includes a positioning system 80, an arm 82, a push-pin 84, a shaft 86 and a selector 88. The positioning system 80 rotates the arm 82 about the shaft 86, and the arm 82 carries the push-pin 84. The servo track writer 76 includes laser interferometry for position measurements, and may also include a fixed head for writing a clock track onto one disk surface in the disk drive 10 during servo track writing.

The positioning system 80 provides a controller to position and move the actuator 16 and thus the head 14 over the disk 12 to precondition the disk drive 10. Further, the selector 88 selects the proper write current for the head 14 during the preconditioning.

The servo track writer 76 also performs servo track writing in the disk drive 10 after preconditioning the disk drive 10. During servo track writing, the servo track writer 76 supplies power to a spindle motor (not shown) in the disk drive 10 for rotating the disk 12, the push-pin 84 extends through an opening in a housing of the disk drive 10 (before final assembly) and mechanically contacts the actuator 16, the shaft 86 is coaxial with the axis of rotation of the actuator 16, the positioning system 80 moves the head 14 and the actuator 16 via the arm 82 and the push-pin 84 across the disk 12, and servo track writer 76 causes the head 14 to write track address and fine servo patterns at servo sectors for each track on the disk 12.

The positioning system 80 includes a servo controlled motor (not shown) which uses an encoder or other interferometer for position feedback to determine the angular position of the shaft 86. The servo track writer 76 also applies a small bias current to the VCM 18 in a direction oppose to the movement of the push-pin 84 to maintain the actuator 16 against the push-pin 84 and ensure precision in locating the head 14.

Figure 7:
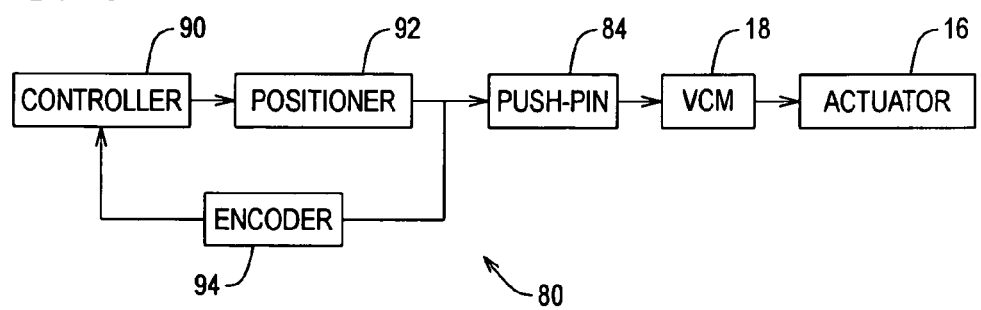
FIG. 7 shows a control scheme for the servo track writer. Like reference numbers refer to like elements.

FIG. 7 shows a block diagram of a feedback control scheme for the servo track writer 76. The positioning system 80 includes a controller 90, a positioner 92 and an encoder 94. The controller 90 controls the positioner 92 to move the push-pin 84, and the encoder 94 senses and provides the rotational position of the push-pin 84, and therefore the actuator 16 and the head 14, to the controller 90. The positioning system 80 injects a force into the actuator 16 and the VCM 18 to position the head 14 for writing servo tracks on the disk 12.

The servo track writer 76 can use a non-contact optical push-pin instead of the mechanical push-pin 84. With the optical system, the actuator 16 includes a small diffraction grating, and the arm 82 includes an interferometric position sensor that emits an optical beam into the disk drive 10 and determines the position of the actuator 16 by monitoring the light diffracted from the grating. The positioning system 80 continues to control the angular position of the shaft 86, the controller 90 and/or the positioner 92 control the VCM 18 to drive the actuator 16, and the encoder 94 provides position feedback to achieve closed loop servo control of the actuator 16 with respect to the shaft 86. Further, the controller 90 uses the feedback signal from the encoder 94 to control the VCM 18 to actively follow the optical push-pin rather than applying a mechanical biasing force to the actuator 16.

The present invention has particular utility for GMR heads but is also useful for conventional MR heads. The present invention has been described in terms of a GMR read/write head, however, it should be understood that MR read/write heads are an equivalent substitute for purposes of the present invention.

The present invention is also useful for printed media applications where the disk drive self-servo writes the servo patterns and a servo track writer is not used. During self-servo writing, the disk drive uses a printed media reference pattern with relatively low resolution on a reference disk to position the head to write high resolution final servo patterns on the disk. The preconditioning can be performed on the disk while the disk drive is in a rack before the self-servo writing occurs.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of preconditioning a disk drive for data storage, the disk drive having a disk for recording thereon with a head positionable on the disk by an actuator, comprising the steps of:
    (a) selecting a write current for the head such that application of the write current to the head causes thermal expansion in the head due to the magnitude of the write current, wherein the write current is selected to be higher than a write current for recording data on the disk;
    (b) rotating the disk;
    (c) applying the selected write current to the head to cause thermal expansion in the head due to the write current;
    (d) positioning the head over the disk with the actuator, such that the head is supported by an air bearing between the head and the disk, wherein the head is at lower than normal fly height over the disk due to the thermal expansion; and
    (e) moving the actuator across the disk while the head is at lower than normal fly height over the disk due to the thermal expansion, whereby interference between the head and the disk burnishes the head and disk interface.

2. The method of claim 1, wherein:
    in step (a) the write current is selected such that application of the write current to the head causes the thermal expansion of the head, such that positioning the head in step (d) causes the head to fly at essentially minimum fly height over the disk; and
    step (e) comprises moving the actuator across the disk while the head is at essentially minimum fly height over the disk due to the thermal expansion, whereby interference between the head and the disk burnishes the head and disk interface.

3. The method of claim 1, wherein:
    in step (a) the write current is selected such that application of the write current to the head causes the thermal expansion of the head, such that positioning the head in step (d) causes the head to be essentially in contact with the disk; and
    step (e) comprises moving the actuator across the disk while the head is essentially in contact with the disk due to the thermal expansion, whereby interference between the head and the disk burnishes the head and disk interface.

4. The method of claim 3, wherein the head comprises a burnish proximity air bearing surface.

5. The method of claim 1, wherein positioning the head over the disk without application of the write current causes the head to fly essentially at normal fly height on an air bearing over the disk.

6. The method of claim 1, wherein step (e) further includes moving the actuator to sweep the head across the disk from an inner diameter to an outer diameter of the disk.

7. The method of claim 1, wherein step (e) further includes moving the actuator to sweep the head across the disk from an outer diameter to an inner diameter of the disk.

8. The method of claim 1, wherein the preconditioning prepares the disk drive for writing servo patterns on the disk.

9. The method of claim 8, wherein the preconditioning prepares the disk drive for writing servo patterns on the disk using a servo track writer.

10. The method of claim 8, wherein the preconditioning prepares the disk drive for self-servo writing servo patterns on the disk using a printed media reference pattern.

11. The method of claim 1, wherein the burnishing smoothens the head, scrubs the disk, smoothens lubricant on the disk and removes asperities from the disk.

12. The method of claim 1, wherein the write current is selected to be at least twice a write current for recording data on the disk.

13. The method of claim 1, wherein the disk contains no magnetic information during the burnishing.

14. A servo track writer for preconditioning a disk in a disk drive for writing servo tracks on the disk, the disk drive having the disk for recording thereon with a head positionable on the disk by an actuator, the servo track writer comprising:

a selector for selecting and applying a write current to the head such that application of the write current to the head causes thermal expansion in the head due to the magnitude of the write current, wherein the selector selects the write current to be higher than a write current for recording data on the disk; and a controller that (i) drives the actuator to position the head over the disk, such that the head is supported by an air bearing between the head and the disk, wherein the head is at lower than normal fly height over the disk due to the thermal expansion, and (ii) drives the actuator to move the head across the disk while at lower than normal fly height over the disk due to the thermal expansion, whereby interference between the head and the disk burnishes the head and disk interface.

15. The servo track writer of claim 14, wherein:

the selector selects the write current such that application of the write current to the head causes the thermal expansion of the head, such that positioning the head over the disk causes the head to fly at essentially minimum fly height over the disk; and the controller drives the actuator to move the head across the disk while the head is at essentially minimum fly height over the disk due to the thermal expansion, whereby interference between the head and the disk burnishes the head and disk interface.

16. The servo track writer of claim 14, wherein:

the selector selects the write current such that application of the write current to the head causes the thermal expansion of the head, such that positioning the head over the disk causes the head to be essentially in contact with the disk; and the controller drives the actuator to move the head across the disk while the head is essentially in contact with the disk due to the thermal expansion, whereby interference between the head and the disk burnishes the head and disk interface.

17. The servo track writer of claim 14, wherein the head comprises a burnish proximity air bearing surface.

18. The servo track writer of claim 14, wherein positioning the head over the disk without application of the write current causes the head to fly at essentially normal fly height on an air bearing over the disk.

19. The servo track writer of claim 14, wherein the controller drives the actuator to sweep the head across the disk from an inner diameter to an outer diameter of the disk.

20. The servo track writer of claim 14, wherein the controller drives the actuator to sweep the head across the disk from an outer diameter to an inner diameter of the disk.

21. The servo track writer of claim 14, wherein the preconditioning prepares the disk drive for writing servo patterns on the disk.

22. The servo track writer of claim 14, wherein the burnishing smoothens the head, scrubs the disk, smoothens lubricant on the disk and removes asperities from the disk.

23. The servo track writer of claim 14, wherein the selector selects the write current to be at least twice a write current for recording data on the disk.

24. The servo track writer of claim 14, wherein the disk contains no magnetic information during the burnishing.

25. A disk drive, comprising:

a disk;

a head positionable on the disk for recording thereon;

an actuator for positioning the head on the disk; and a controller that (i) applies a selected write current to the head such that application of the write current to the head causes thermal expansion in the head due to the magnitude of the write current, wherein the write current is higher than a write current for recording data on the disk, (ii) drives the actuator to position the head over the disk, such that the head is supported by an air bearing between the head and the disk, wherein the head is at lower than normal fly height over the disk due to the thermal expansion, and (iii) drives the actuator to move the head across the disk while at lower than normal fly height over the disk due to the thermal expansion, whereby interference between the head and the disk burnishes the head and disk interface.

26. The disk drive of claim 25, wherein:

the write current is selected such that application of the write current to the head causes the thermal expansion of the head, such that positioning the head over the disk causes the head to fly at essentially minimum fly height over the disk; and the controller drives the actuator to move the head across the disk while the head is at essentially minimum fly height over the disk due to the thermal expansion, whereby interference between the head and the disk burnishes the head and disk interface.

27. The disk drive of claim 25, wherein:

the write current is selected such that application of the write current to the head causes the thermal expansion of the head, such that positioning the head over the disk causes the head to be essentially in contact with the disk; and the controller drives the actuator to move the head across the disk while the head is essentially in contact with the disk due to the thermal expansion, whereby interference between the head and the disk burnishes the head and disk interface.

28. The disk drive of claim 25, wherein the head comprises a burnish proximity air bearing surface.

29. The disk drive of claim 25, wherein the controller selects the write current to be at least twice a write current for recording data on the disk.

30. The disk drive of claim 25, wherein positioning the head over the disk without application of the write current causes the head to fly at essentially normal fly height on an air bearing over the disk.

31. The disk drive of claim 25, wherein the controller drives the actuator to sweep the head across the disk from an inner diameter to an outer diameter of the disk.

32. The disk drive of claim 25, wherein the burnishing prepares the disk drive for writing servo patterns on the disk.

33. The disk drive of claim 25, wherein the burnishing smoothens the head, scrubs the disk, smoothens lubricant on the disk and removes asperities from the disk.

34. The disk drive of claim 25, wherein the controller selects the write current to be at least twice a write current for writing servo patterns on the disk after burnishing the head and disk interface.

35. The disk drive of claim 25, wherein the disk contains no magnetic information during the burnishing.

36. A method of preconditioning and servo track writing in a disk drive, wherein the disk drive includes a head, a disk and an actuator, and the actuator positions the head relative to the disk, the method comprising:

applying a high write current to the head, thereby providing a low fly height for the head due to thermal expansion of the head;

moving the actuator to sweep the head across the disk while applying the high write current to the head and rotating the disk, thereby burnishing the head-disk interface due to interference between the head and the disk caused by the thermal expansion of the head; then applying a normal write current to the head that is smaller than the high write current, thereby providing a normal fly height for the head that is larger than the low fly height; and writing servo patterns to the disk using the head while applying the normal write current to the head and rotating the disk, thereby servo track writing in the disk drive.

37. The method of claim 36, wherein the low fly height is essentially minimum fly height for the head.

38. The method of claim 36, wherein the low fly height has the head essentially in contact with the disk.

39. The method of claim 36, wherein the normal fly height is at least 0.25 microinches larger than the low fly height.

40. The method of claim 36, wherein the actuator sweeps the head from an inner diameter to an outer diameter of the disk.

41. The method of claim 36, wherein the actuator sweeps the head from an outer diameter to an inner diameter of the disk.

42. The method of claim 36, wherein the burnishing smoothens the head.

43. The method of claim 36, wherein the burnishing scrubs the disk.

44. The method of claim 36, wherein the burnishing smoothens lubricant on the disk.

45. The method of claim 36, wherein the burnishing removes asperities from the disk.

46. The method of claim 36, wherein the high write current causes the head to protrude at a trailing edge portion.

47. The method of claim 36, wherein the high write current is at least twice the normal write current.

48. The method of claim 36, wherein the disk contains no magnetic information during the burnishing.

49. The method of claim 36, including applying the normal write current to the head during normal write operations after writing the servo patterns.

50. The method of claim 36, including moving the actuator to sweep the head across the disk while applying the high write current to the head and rotating the disk after writing the servo patterns, thereby over-burnishing the head-disk interface due to interference between the head and the disk caused by the thermal expansion of the head.

51. The method of claim 50, including performing the over-burnishing during manufacturing.

52. The method of claim 50, including performing the over-burnishing during field operation in response to detecting interference between the head and the disk.

53. The method of claim 36, including writing the servo patterns using a servo track writer.

54. The method of claim 36, including self-writing the servo patterns without using a servo track writer.

55. The method of claim 36, including printing a reference pattern on the disk, then assembling the disk into the disk drive, and then self-writing the servo patterns using the reference pattern without using a servo track writer.

56. A method of preconditioning and servo track writing in a disk drive, wherein the disk drive includes a head, a disk and an actuator, and the actuator positions the head relative to the disk, the method comprising:

applying a high write current to the head, thereby providing a low fly height for the head due to thermal expansion of the head at a trailing edge portion of the head;

moving the actuator to sweep the head across the disk while applying the high write current to the head and rotating the disk, thereby burnishing the head-disk interface due to interference between the head and the disk caused by the thermal expansion of the head, wherein the disk contains no magnetic information during the burnishing, and the burnishing smoothens the head, scrubs the disk, smoothens lubricant on the disk and removes asperities from the disk; then applying a normal write current to the head that is smaller than the high write current, thereby providing a normal fly height for the head that is larger than the low fly height; and writing servo patterns to the disk using the head while applying the normal write current to the head and rotating the disk, thereby servo track writing in the disk drive.

57. The method of claim 56, wherein the low fly height has the head essentially in contact with the disk, and the normal fly height is at least 0.25 microinches larger than the low fly height.

58. The method of claim 56, wherein the actuator sweeps the head to and between an inner diameter and an outer diameter of the disk.

59. The method of claim 56, wherein the high write current is at least twice the normal write current.

60. The method of claim 56, including applying the normal write current to the head during normal write operations after writing the servo patterns.

61. The method of claim 56, including moving the actuator to sweep the head across the disk while applying the high write current to the head and rotating the disk after writing the servo patterns, thereby over-burnishing the head-disk interface due to interference between the head and the disk caused by the thermal expansion of the head.

62. The method of claim 61, including performing the over-burnishing during manufacturing.

63. The method of claim 61, including performing the over-burnishing during field operation in response to detecting interference between the head and the disk.

64. The method of claim 56, including writing the servo patterns using a servo track writer.

65. The method of claim 56, including self-writing the servo patterns without using a servo track writer.

66. A method of preconditioning a disk drive for data storage, the disk drive having a disk for recording thereon with a head positionable on the disk by an actuator, comprising the steps of:

(a) selecting a write current for the head such that application of the write current to the head causes thermal expansion in the head due to the magnitude of the write current;

(b) rotating the disk;

(c) applying the selected write current to the head to cause thermal expansion in the head due to the write current;

(d) positioning the head over the disk with the actuator, such that the head is supported by an air bearing between the head and the disk, wherein the head is at lower than normal fly height over the disk due to the thermal expansion; and (e) moving the actuator across the disk while the head is at lower than normal fly height over the disk due to the thermal expansion, whereby interference between the head and the disk burnishes the head and disk interface and the preconditioning prepares the disk drive for writing servo patterns on the disk.

67. The method of claim 66, wherein:
in step (a) the write current is selected such that application of the write current to the head causes the thermal expansion of the head, such that positioning the head in step (d) causes the head to fly at essentially minimum fly height over the disk; and
step (e) comprises moving the actuator across the disk while the head is at essentially minimum fly height over the disk due to the thermal expansion, whereby interference between the head and the disk burnishes the head and disk interface.

68. The method of claim 66, wherein:
in step (a) the write current is selected such that application of the write current to the head causes the thermal expansion of the head, such that positioning the head in step (d) causes the head to be essentially in contact with the disk; and
step (e) comprises moving the actuator across the disk while the head is essentially in contact with the disk due to the thermal expansion, whereby interference between the head and the disk burnishes the head and disk interface.

69. The method of claim 68, wherein the head comprises a burnish proximity air bearing surface.

70. The method of claim 66, wherein positioning the head over the disk without application of the write current causes the head to fly essentially at normal fly height on an air bearing over the disk.

71. The method of claim 66, wherein step (e) further includes moving the actuator to sweep the head across the disk from an inner diameter to an outer diameter of the disk.

72. The method of claim 66, wherein step (e) further includes moving the actuator to sweep the head across the disk from an outer diameter to an inner diameter of the disk.

73. The method of claim 66, wherein the preconditioning prepares the disk drive for writing servo patterns on the disk using a servo track writer.

74. The method of claim 66, wherein the preconditioning prepares the disk drive for self-writing the servo patterns without using a servo track writer.

75. The method of claim 66, wherein the preconditioning prepares the disk drive for self-servo writing servo patterns on the disk using a printed media reference pattern.

76. The method of claim 66, wherein the burnishing smoothens the head, scrubs the disk, smoothens lubricant on the disk and removes asperities from the disk.

77. The method of claim 66, wherein the write current is selected to be at least twice a write current for recording data on the disk.

78. The method of claim 66, wherein the disk contains no magnetic information during the burnishing.

79. A method of preconditioning a disk drive for data storage, the disk drive having a disk for recording thereon with a head positionable on the disk by an actuator, comprising the steps of:
(a) selecting a write current for the head such that application of the write current to the head causes thermal expansion in the head due to the magnitude of the write current;
(b) rotating the disk;
(c) applying the selected write current to the head to cause thermal expansion in the head due to the write current;
(d) positioning the head over the disk with the actuator, such that the head is supported by an air bearing between the head and the disk, wherein the head is at lower than normal fly height over the disk due to the thermal expansion; and
(e) moving the actuator across the disk while the head is at lower than normal fly height over the disk due to the thermal expansion, whereby interference between the head and the disk burnishes the head and disk interface and the disk contains no magnetic information during the burnishing.

80. The method of claim 79, wherein:
in step (a) the write current is selected such that application of the write current to the head causes the thermal expansion of the head, such that positioning the head in step (d) causes the head to fly at essentially minimum fly height over the disk; and
step (e) comprises moving the actuator across the disk while the head is at essentially minimum fly height over the disk due to the thermal expansion, whereby interference between the head and the disk burnishes the head and disk interface.

81. The method of claim 79, wherein:
in step (a) the write current is selected such that application of the write current to the head causes the thermal expansion of the head, such that positioning the head in step (d) causes the head to be essentially in contact with the disk; and
step (e) comprises moving the actuator across the disk while the head is essentially in contact with the disk due to the thermal expansion, whereby interference between the head and the disk burnishes the head and disk interface.

82. The method of claim 81, wherein the head comprises a burnish proximity air bearing surface.

83. The method of claim 79, wherein positioning the head over the disk without application of the write current causes the head to fly essentially at normal fly height on an air bearing over the disk.

84. The method of claim 79, wherein step (e) further includes moving the actuator to sweep the head across the disk from an inner diameter to an outer diameter of the disk.

85. The method of claim 79, wherein step (e) further includes moving the actuator to sweep the head across the disk from an outer diameter to an inner diameter of the disk.

86. The method of claim 79, wherein the preconditioning prepares the disk drive for writing servo patterns on the disk using a servo track writer.

87. The method of claim 79, wherein the preconditioning prepares the disk drive for self-writing the servo patterns without using a servo track writer.

88. The method of claim 79, wherein the preconditioning prepares the disk drive for self-servo writing servo patterns on the disk using a printed media reference pattern.

89. The method of claim 79, wherein the burnishing smoothens the head, scrubs the disk, smoothens lubricant on the disk and removes asperities from the disk.

90. The method of claim 79, wherein the write current is selected to be at least twice a write current for recording data on the disk.

* * * * *